(12) United States Patent
Lin et al.

(10) Patent No.: US 11,727,119 B2
(45) Date of Patent: Aug. 15, 2023

(54) MIGRATION RISK ASSESSMENT, RECOMMENDATION, AND IMPLEMENTATION

(71) Applicant: International Business Machines Corporation, Armonk, NY (US)

(72) Inventors: Chen Lin, Elmsford, NY (US); Muhammed Fatih Bulut, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 16/904,688

(22) Filed: Jun. 18, 2020

(65) Prior Publication Data
US 2021/0398023 A1    Dec. 23, 2021

(51) Int. Cl.
| | | |
|---|---|---|
| *G06Q 10/06* | (2023.01) | |
| *G06F 9/50* | (2006.01) | |
| *G06F 21/57* | (2013.01) | |
| *G06N 20/10* | (2019.01) | |
| *G06F 9/48* | (2006.01) | |
| *G06N 20/20* | (2019.01) | |
| *G06F 18/21* | (2023.01) | |
| *G06F 18/243* | (2023.01) | |

(52) U.S. Cl.
CPC .......... *G06F 21/577* (2013.01); *G06F 9/4862* (2013.01); *G06F 18/217* (2023.01); *G06F 18/24323* (2023.01); *G06N 20/10* (2019.01); *G06N 20/20* (2019.01)

(58) Field of Classification Search
CPC ................................. G06Q 10/06; G06F 9/50

USPC ....................................................... 705/7.29
See application file for complete search history.

(56) References Cited

U.S. PATENT DOCUMENTS

| | | |
|---|---|---|
| 8,423,646 B2 | 4/2013 | Jamjoom et al. |
| 9,692,632 B2 | 6/2017 | Bhattacharya et al. |
| (Continued) | | |

OTHER PUBLICATIONS

Xu, S., et al., "Multi-output least-squares support vector regression machines", Pattern Recognition Letters, 34(9), pp. 1078-1084, 2013.

(Continued)

*Primary Examiner* — Nga B Nguyen
(74) *Attorney, Agent, or Firm* — Lieberman & Brandsdorfer, LLC

(57) ABSTRACT

Embodiments relate to a system, a program product, and a method to support a migration operation. Risk factors associated with a migration operation are assessed. The assessment includes assigning respective risk score values to the identified risk factors, assigning respective weight values to the identified risk factors, and calculating a composite risk score based on the assigned risk score values and the assigned weight values. At least one remediation action is recommended to reduce risk to the migration operation. The at least one recommended remediation action is implemented prior to execution of the migration operation. A migration plan incorporating the remediation action for the migration operation is generated. At least one machine learning (ML) model is employed in connection with (a) the subjecting of the identified risk factors to the assessment and/or (b) the recommending of at least one remediation action to reduce risk to the migration operation.

20 Claims, 10 Drawing Sheets

(56) References Cited

U.S. PATENT DOCUMENTS

| | | | |
|---|---|---|---|
| 9,697,266 | B1 | 7/2017 | Nagesh et al. |
| 9,753,757 | B2 | 9/2017 | Dow et al. |
| 10,249,014 | B2 | 4/2019 | Bala et al. |
| 10,671,439 | B1* | 6/2020 | Frandzel ................. G06F 3/067 |
| 10,776,244 | B2* | 9/2020 | Davis ................. G06F 11/3442 |
| 2016/0314014 | A1 | 10/2016 | Dow et al. |
| 2017/0352105 | A1* | 12/2017 | Billings ................. G06Q 40/08 |
| 2018/0091625 | A1 | 3/2018 | Hwang et al. |
| 2019/0005467 | A1* | 1/2019 | Varagani ............ G06Q 20/4016 |
| 2019/0182323 | A1* | 6/2019 | Srinivasan ............ G06F 9/5088 |
| 2019/0288915 | A1* | 9/2019 | Denyer ............ G06Q 10/06315 |
| 2019/0354850 | A1 | 11/2019 | Watson et al. |
| 2020/0264919 | A1* | 8/2020 | Vukovic ................. H04L 67/34 |
| 2020/0267125 | A1* | 8/2020 | Gunasingam ........... H04L 63/20 |
| 2020/0285546 | A1* | 9/2020 | Kraplanee ............. G06F 16/116 |
| 2021/0081379 | A1* | 3/2021 | Buehne ................. G06F 16/275 |
| 2021/0174280 | A1* | 6/2021 | Ratnapuri ............... H04L 67/51 |
| 2021/0200616 | A1* | 7/2021 | Xu ........................ G06F 3/0617 |

OTHER PUBLICATIONS

Liaw, A., et al., "Classification and Regression by randomForest", R news, 2(3), pp. 18-22, Dec. 2002.

Chen, M., et al., "Top-K Off-Policy Correction for a REINFORCE Recommender System", In Proceedings of the Twelfth ACM International Conference on Web Search and Data Mining, pp. 456-464, Jan. 2019.

Islam, S., et al., "A Risk Management Framework for Cloud Migration Decision Support", Journal of Risk and Financial Management, 10(2), 2017.

\* cited by examiner

Risk Factor Report

F1: Data Authorization
Authorized

F2: Application Owner
Known (John Doe)

F3: Server Application (dependency)
No dependency

F4: Migration Bandwidth
Within migration bandwidth

F5: Target Readiness
Target is ready

F6: Business Criticality
Very high

F7: Data Sensitivity
Sensitive

F8: Age and Outdatedness
All software updated
Software age less than 10 years

F9: Monitoring & Logging Tool
Custom tool not required

F10: Hard Licensing
No hard licensing

F11: Compliance Requirements
All compliances met

F12: AAQ Validity
AAQ is valid

F13: Migration Type
Rehost

F14: third-Party COTS Product
Yes (need third-party team support)

– – 
MIGRATION RISK ASSESSMENT, RECOMMENDATION, AND IMPLEMENTATION

BACKGROUND

The present embodiments relate to a system, a computer program product, and a method for migration risk assessment, recommendation, and implementation to a target environment, especially but not limited to a cloud environment.

As technology advances, an enterprise is often presented with opportunities to improve upon or modernize its legacy data, applications, and services. One such example is that of migration to a cloud environment. Traditionally, the enterprise's data, applications, and services may be maintained on-premises behind a firewall. With the recent proliferation of cloud-based solutions, it has become apparent that capital and operational expenditures can be reduced by migrating all or part of the enterprise's data, applications, and services to the cloud.

In addition to cost savings, cloud migration potentially provides numerous other advantages such as dynamic scaling, high availability, multi-tenancy, and effective resource allocation. However, cloud migration also presents various risks, including but not limited to technical challenges and security concerns.

SUMMARY

Embodiments disclosed herein include a system, a computer program product, and a method for assessing risks association with a migration operation, and recommending at least one remediation for reducing the risks.

In one aspect, a method is provided for a migration operation. A plurality of risk factors associated with a migration operation is identified, and the identified risk factors are subject to an assessment. At least one remediation action is recommended to reduce risk to the migration operation. The at least one recommended remediation action is implemented prior to execution of the migration operation. A migration plan incorporating the at least one recommended remediation action for the migration operation is generated. In the method, at least one machine learning (ML) model is employed in connection with the subjecting of the identified risk factors to the assessment and/or the recommending of at least one remediation action to reduce risk to the migration operation.

In another aspect, a computer system is provided. The computer system comprises a processing unit operatively coupled to memory and an artificial intelligence (AI) platform operatively coupled to the processing unit. The AI platform is configured with one or more tools to support a migration operation that comprises identifying a plurality of risk factors associated with the migration operation. The one or more tools comprise: a score manager to leverage a first machine learning (ML) model to assess the identified risk factors; a recommendation manager to leverage a second ML model to recommend at least one remediation action to reduce risk to the migration operation; and/or a prediction manager to leverage a third ML model to predict an outcome of a migration plan incorporating the at least one mediation action.

In yet another aspect, a computer program product is provided. The computer program product comprises a computer readable storage medium having a program code embodied therewith to support a migration operation that comprises identifying a plurality of risk factors associated with the migration operation. The program code is executable by a processor to: leverage a first machine learning (ML) model to assess the identified risk factors; leverage a second ML model to recommend at least one remediation action to reduce risk to the migration operation; and/or leverage a third ML model to predict an outcome of a migration plan incorporating the at least one mediation action.

These and other aspects, including but not limited to systems, apparatus, products, assemblies, sub-assemblies, methods, and processes will become apparent from the following detailed description of the exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

FIG. 6 is an illustration of an example of a risk factor report.

DETAILED DESCRIPTION

Figure 1:
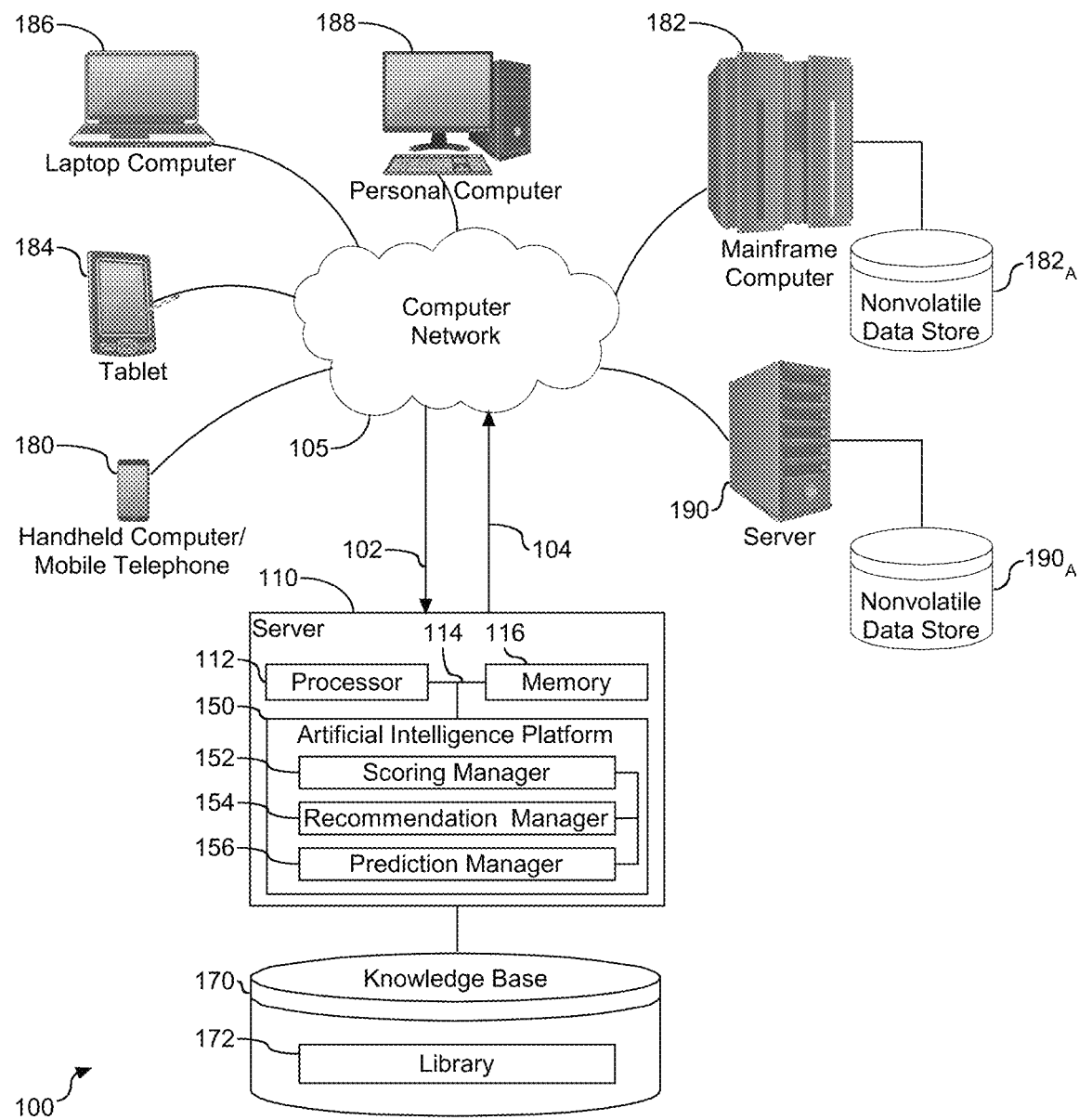
FIG. 1 depicts a system diagram illustrating an artificial intelligence platform computing system.

It will be readily understood that the components of the exemplary embodiments, as generally described and illustrated in the Figures herein, may be arranged and designed in a wide variety of different configurations. Thus, the following detailed description of the embodiments of the apparatus, system, method, and computer program product of the exemplary embodiments, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Migration typically involves moving data, applications, and other business assets to a cloud computing environment. A cloud computing environment may comprise computer centers available to users over the Internet, and may comprise central servers for distributing functions to multiple locations.

Migration, such as from a local server to a cloud, involves risk assessment and remediation actions before migration takes place. Risk assessment and remediation actions can be time-consuming and tedious processes, especially when performed manually.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. For example, to process natural language, the system may be trained with data derived from a database or corpus of knowledge.

Machine learning (ML), which is a subset of AI, utilizes algorithms to learn from data and create foresights based on this data. More specifically, ML is the application of AI through creation of models, for example, neural networks that can demonstrate learning behavior by performing tasks that are not explicitly programmed. Deep learning is a type of ML in which systems can accomplish complex tasks by using multiple layers of neurons that activate based on an output or outputs of a previous layer of neurons, creating increasingly smarter and more abstract activations.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content in response to the identification and understanding as well as changes to the structures are extremely difficult at a practical level.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Referring to FIG. 1, a schematic diagram of a computing system (100) to support a computer migration, such as to the cloud, is depicted. As shown, a server (110) is provided in communication with a plurality of computing devices (180), (182), (184), (186), (188), and (190) across a network (105). The server (110) is configured with a processing unit (112) in communication with memory (116) across a bus (114). The server (110) is shown with an artificial intelligence (AI) platform (150) for migration management and support, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the computer network (105) enable migration, including risk assessment, recommendation, and prediction. The server (110) is in operative communication with the computer network (105) through communications links (102) and (104). Links (102) and (104) may be wired or wireless. In an embodiment, link (102) is synonymous with input data communicated to the server (110), and link (104) is synonymous with output data communicated to one of the computing devices (180), (182), (184), (186), (188), and (190) across the network (105). Other embodiments of the server (110) may be used with components, systems, sub-systems, and/or devices other than those that are depicted herein.

The AI platform (150) is shown herein configured to receive input (102) from various sources. For example, the AI platform (150) may receive input from the network (105) and leverage a data source (170), also referred to herein as a corpus or knowledge base, to create output or response content. The AI platform (150) is provided with tools to support and enable assessment, recommendation, and prediction associated with a migration operation.

In an embodiment, the AI platform (150) communicates response output to members operatively coupled to the server (110), such as one or more of the computing devices (180), (182), (184), (186), (188), and (190) across the network (105).

The AI platform (150) is shown herein configured with tools to facilitate a migration operation. The tools include, but are not limited to, a score manager (152), a recommendation manager (154), and a prediction manager (156). The AI platform (150) may receive input from the network (105) and leverage a data source (170), also referred to herein as a corpus or knowledge base, to perform steps and functions association with the migration operation. As shown the data source (170) is configured with a library (172) that is subject to support and management by the tools (152), (154), and (156), each of which is described in greater detail in connection with the flowcharts shown in FIGS. 4 and 5 below. Although only one library is show, in one embodiment, the data source (170) may be configured with multiple libraries.

The network (105) may include local network connections and remote connections in various embodiments, such that the AI platform (150) may operate in environments of any size, including local and global, e.g. the Internet. Additionally, the AI platform (150) serves as a system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

In some illustrative embodiments, server (110) may be the IBM Watson® system available from International Business Machines Corporation of Armonk, N.Y., may be augmented with the mechanisms of the illustrative embodiments described hereafter. The tools shown herein as the score manager (152), the recommendation manager (154), and the prediction manager (156), herein referred to collectively as AI tools or AI platform tools, are shown as being embodied in or integrated within the AI platform (150) of the server (110). The AI tools may be implemented in a separate computing system (e.g., 190) that is connected across network (105) to the server (110).

Types of information handling systems that can benefit from the use of the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes non-volatile data store (190$_A$), and mainframe computer (182) utilizes nonvolatile data store (182$_A$). The non-volatile data store (182$_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The AI platform (150) is configured with one or more of tools (152), (154), and (156) to support a migration operation that comprises identifying a plurality of risk factor associated with the migration operation. The one or more tools may include the score manager (152) to leverage a first machine learning (ML) model to assign respective risk score values to the identified risk factors, assign respective weight values to the identified risk values, and/or calculate a composite risk score based on the assigned risk score values and the assigned weight values. The one or more tools may also include the recommendation manager (154) to leverage a second ML model to recommend at least one remediation action to reduce risk to the migration operation. The recommendation is based on at least the composite risk score and one or more of the risk score values. The one or more tools may also include the prediction manager (156) to leverage a third ML model to predict an outcome of a migration plan incorporating the at least one mediation action.

Figure 2:
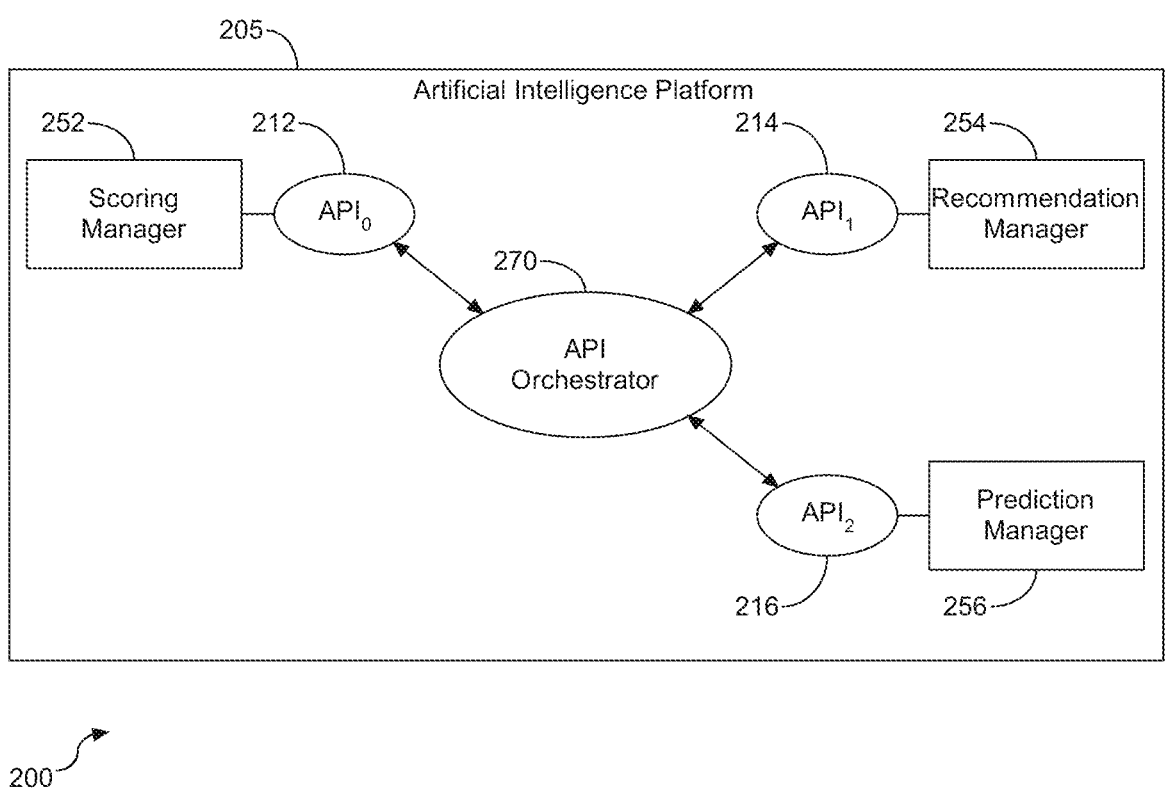
FIG. 2 depicts a block diagram illustrating artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152), (154), and (156) and their associated functionality. Referring to FIG. 2, a block diagram (200) is provided illustrating tools (252), (254), and (256) and their associated APIs. As shown, a plurality of tools is embedded within AI platform (205), with the tools including the score manager (152) shown in FIG. 2 as (252) associated with API$_0$ (212), the recommendation manager (154) shown in FIG. 2 as (254) associated with API$_1$ (214), and the prediction manager (156) shown in FIG. 2 as (256) associated with API$_2$ (216). Each of the APIs may be implemented in one or more languages and interface specifications. API$_0$ (212) provides functional support to assign respective weight values; API$_1$ (214) provides functional support to provide a recommendation of at least one remediation action; API$_2$ (216) provides functional support to predict whether a migration plan will be successful when implemented.

As shown, each of the APIs (212), (214), and (216) are operatively coupled to an API orchestrator (270), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
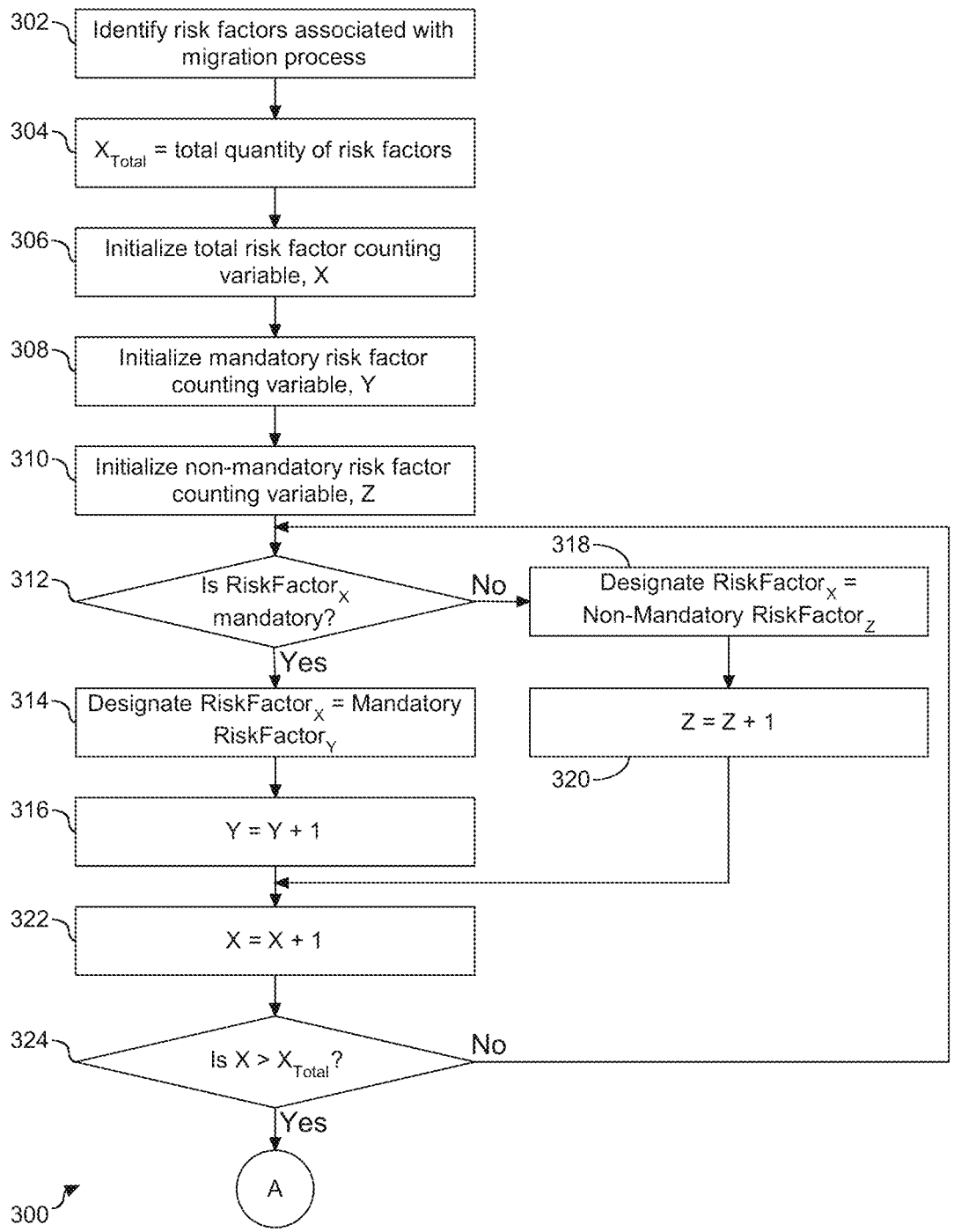
FIGS. 3A and 3B depict a flowchart illustrating an embodiment of a method for identifying risk factors relating to a migration operation, grouping the risk factors into mandatory and non-mandatory categories, and resolving the mandatory risk factors.
Figure 3B:
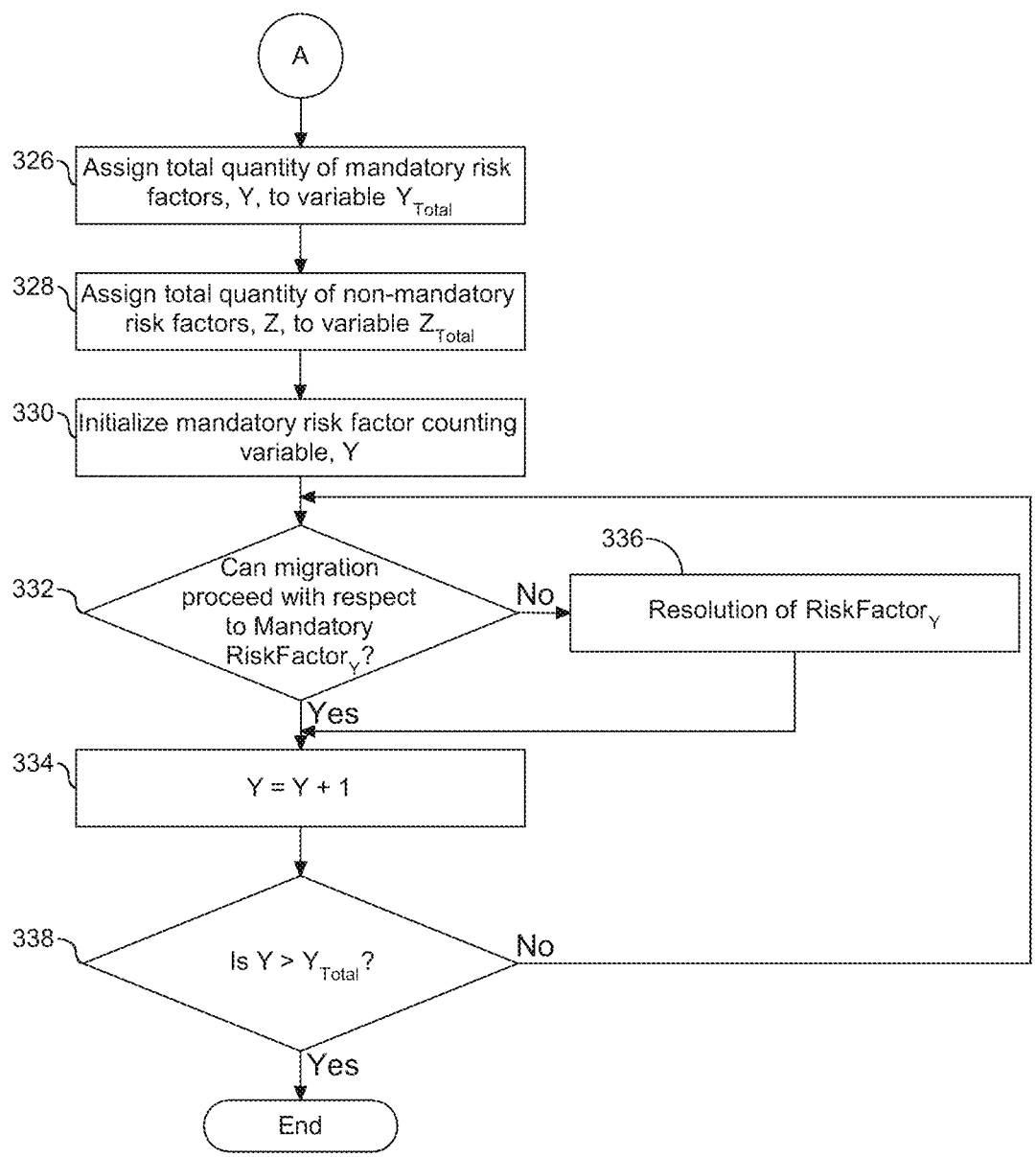
Figure 4:
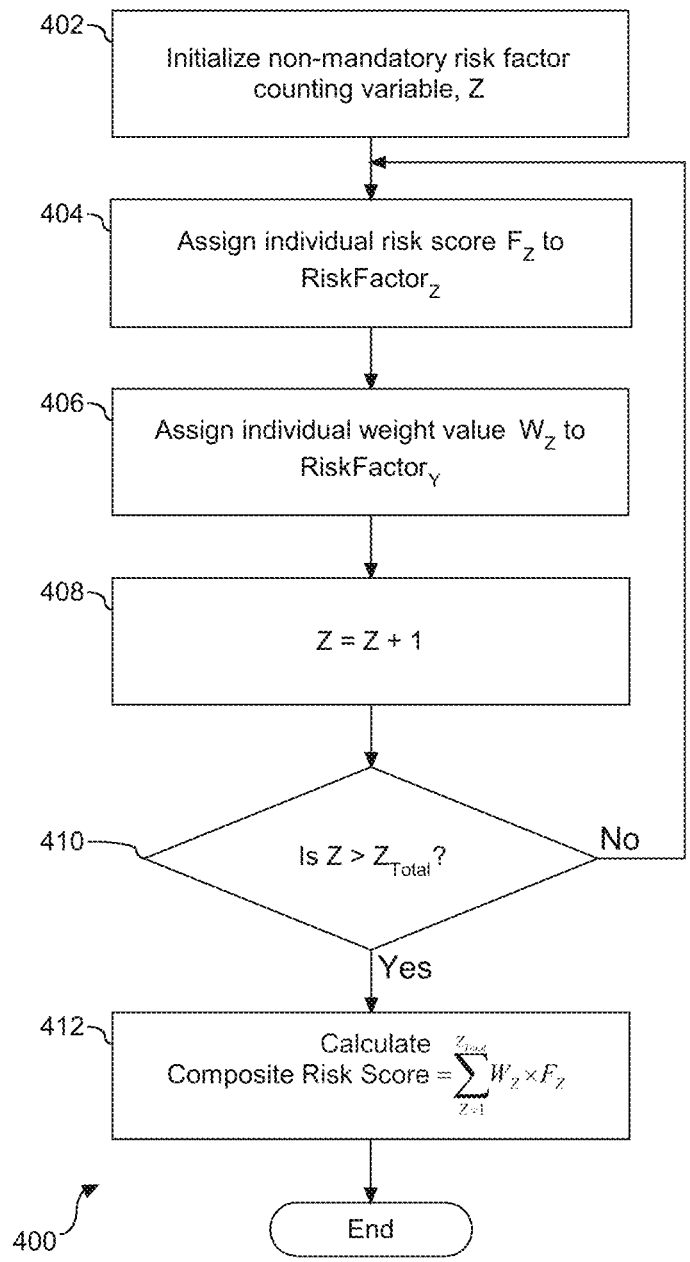
FIG. 4 is a flowchart illustrating an embodiment for determining a composite risk score in association with a migration operation.
Figure 5:
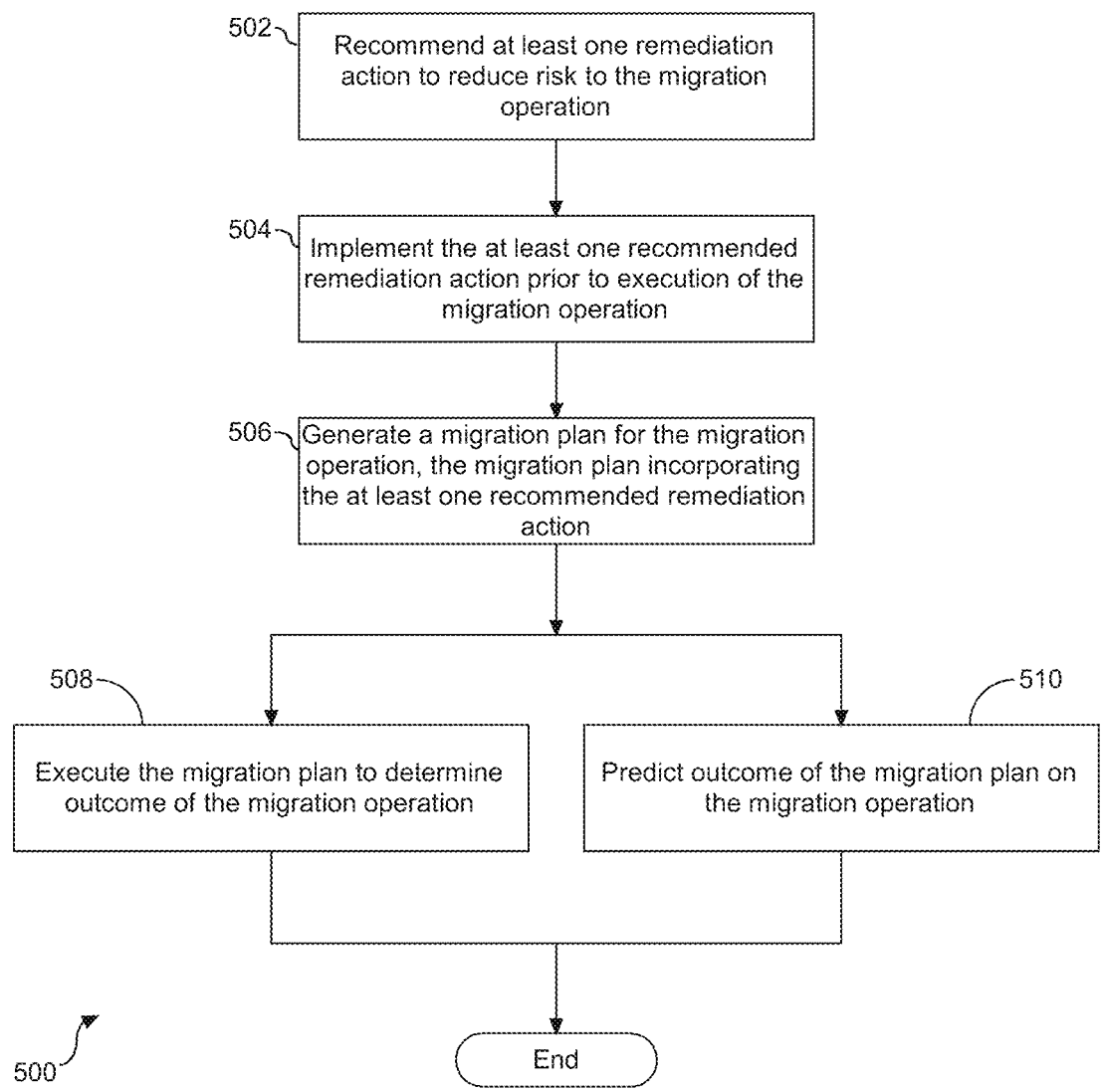
FIG. 5 is a flowchart illustrating an embodiment for recommending and implementing at least one mediation action, generating a migration plan incorporating the at least one remediation action, and executing and/or predicting an outcome of the migration plan.

Referring now to the exemplary method of FIGS. 3A and 3B, flowchart (300) illustrates a method for identifying risk factors relating to a migration operation, grouping the risk factors into categories as either mandatory risk factors or non-mandatory risk factors, and resolving the mandatory risk factors, where resolution is required. FIGS. 4 and 5, discussed below, illustrate additional flowcharts for further processing of the non-mandatory risk factors.

The exemplary method of FIGS. 3A and 3B includes identifying a plurality of risk factors associated with a migration process (302). Identification of the risk factors may be performed by a computer system, computer software, a subject matter expert (SME), a migration team, a global business service (GBS), etc. Risk factors may be identified based on information gathered from, for example, an application assessment questionnaire (AAQ), inventory data, technical documents, ticket data, software scanning reports, inputs regarding migration type and target environment readiness, client business profiles, client compensating control, other sources, or combinations thereof.

Referring to FIG. 6, a block diagram (600) is provided to illustrate an example risk factor report (600) prepared as a result of identifying the risk factors (302). The risk factor report (600) identifies fourteen risk factors, including: F1: Data Authorization; F2: Application Owner; F3: Server Application Dependency; F4: Migration Bandwidth; F5: Target Readiness; F6: Business Criticality; F7: Sensitive Data; F8: Age & Outdatedness; F9: Monitoring & Logging Tool; F10: Hard Licensing; F11: Compliance Requirements; F12: AAQ Validity; F13: Migration Type; and F14: Third-Party COTS Product. The fourteen risk factors identified in FIG. 6 are provided by way of example and for explanatory purposes. The risk factors considered in the various embodiments described herein may include none of the risk factors set forth in FIG. 6, additional risk factors not set forth in FIG. 6, a new set of risk factors not set forth in FIG. 6, and/or a subset of the risk factors set forth in FIG. 6.

Returning to FIGS. 3A and 3B, the total quantity of risk factors identified at step (302) is assigned value $X_{Total}$ (304), e.g., $X_{Total}$ equals fourteen in connection with the risk factor report (600) of FIG. 6. As discussed below, the risk factors may be segregated into categories, e.g. groups, with the categories representing mandatory and non-mandatory risk factors, respectively. In an embodiment, additional categories of risk factors may be applied to the segregation. Risk factor category counting variables for the total quantity of risk factors, the quantity of mandatory risk factors, and the quantity of non-mandatory risk factors are subject to initialization. As shown, a total risk factor counting variable X is initialized (306), a mandatory risk factor (discussed below) counting variable Y is initialized (308), and a non-mandatory risk factor (discussed below) counting variable Z is initialized (310).

Each of the risk factors (F1 to F14) is subject to a decision (312). As shown in FIGS. 3A and 3B, the decision (312) is made for each of the identified risk factors (F1 to F14) consecutively. The decision (312) involves a determination, for each of the risk factors (F1 to F14), or RiskFactor$_X$, as to whether the RiskFactor$_X$ involves a mandatory specification as to the viability of migration or a non-mandatory specification associated with migration. A specification is a requirement, condition, consideration, or qualification associated with the migration operation. As referred to hereinafter, the decision (312) separates the risk factors (F1 to F14) into two groups: a first group of first risk factors representing mandatory specifications (also referred to herein as the mandatory risk factors) and a second group of second risk factors representing non-mandatory specifications (also referred to herein as non-mandatory risk factors). In an exemplary embodiment, RiskFactor$_X$ represents a mandatory specification if the migration operation either can or cannot proceed based on the status of the specification.

In the context of risk factors F1 to F14 of the illustrated embodiment of FIG. 6, risk factors F1 to F5 are mandatory and F6 to F14 are non-mandatory. For example, with respect to first risk factor F1, the risk factor report (600) indicates that data authorization has occurred, such that the migration operation may proceed. If the risk factor report (600) indicated that data authorization had not occurred, the migration operation may not proceed until such authorization is attained. With respect to first risk factor F2, the application owner is either known, in which case the migration operation may proceed, or the application is not known, in which case the migration operation cannot proceed. The risk factor report (600) indicates that the application owner, John Doe, is known. With respect to first risk factor F3, either server dependency has been eliminated, in which case the migration operation can proceed, or server dependency remains, in which case the migration operation cannot proceed. The risk factor report (600) indicates no dependency, so the migration operation can proceed. With respect to first risk factors F4 and F5, either the specification is within an allowable bandwidth and the target is ready (as indicated in the risk factor report (600)), respectively, in which case the migration operation can proceed, or the specification is outside an allowable bandwidth and/or the target is not ready, respectively, in which case the migration operation cannot proceed.

The second risk factors F6 to F14 are non-mandatory with respect to the viability of the migration operation. Each of the second risk factors is associated with the migration, but not in a mandatory capacity. For example, with respect to risk factor F6, the higher the business criticality of the migration operation, the more risk involved. F7 relates to the sensitivity of the business assets for the migration operation, wherein higher sensitivity will typically be associated with higher risk, but not so high as to prevent the migration operation. F8 relates to updating of software, and may be used to determine the amount of software that still requires updating post-migration. Some or all of the second risk factors F6 to F14 might be characterized as a sliding scale with respect to risk.

If RiskFactor$_X$ (e.g., F1) is determined to represent a mandatory specification at decision (312), the RiskFactor$_X$ is a "first risk factor" or "mandatory risk factor." At (314), the RiskFactor$_X$ is designated Mandatory RiskFactor$_Y$, and the mandatory risk factor counting variable Y is incremented. On the other hand, if RiskFactor$_X$ (e.g., F6) is determined to represent a non-mandatory specification at decision (312), the RiskFactor$_X$ is a "second risk factor" or "non-mandatory risk factor." At (318), the RiskFactor$_X$ is designated Non-Mandatory RiskFactor$_Z$, and the non-mandatory risk factor counting variable Z is incremented (320). After steps (316) and (320), the total risk factor counting variable, X, is incremented (322), and a decision is made whether each of the risk factors have been identified as mandatory or non-mandatory (324). A negative response at (324) means that not all of the risk factors have been identified as mandatory or non-mandatory, and the method returns to step (312). On the other hand, an affirmative response at (324) means that all of the risk factors have been identified as either manda-tory or non-mandatory. The total quantity of mandatory risk factors, Y, is assigned to the variable Y$_{Total}$, and the total quantity of non-mandatory risk factors, Z, is assigned to the variable Z$_{Total}$, as shown at steps (326) and (328), respectively.

At (330), the mandatory risk factor counting variable Y is again initialized. Mandatory RiskFactor$_Y$ is subject to a decision (332), whereby a determination is made whether the status of the Mandatory RiskFactor$_Y$ is consistent with proceeding with the migration operation. In the case of risk factor F1, i.e., Data Authorization, the Risk Factor Report (600) indicates that authorization has been provided, such that the migration operation can proceed. For an affirmative answer to (332), the mandatory risk factor counting variable, Y, is incremented (334). Alternatively, if the decision at step (332) determines that the specification of the Mandatory RiskFactor$_Y$ has not been satisfied such that migration cannot proceed, e.g., because authorization has not been granted, then the Mandatory RiskFactor$_Y$ is resolved (336), e.g., authorization is granted. Following step (336), the mandatory risk factor counting variable Y is incremented. Following step (334), a decision (338) is then made as to whether each of the identified mandatory risk factors has been resolved so that migration may proceed in view of the mandatory risk factors (338). An affirmative answer to (338) means that all of the mandatory risk factors have been processed, and the method of FIGS. 3A and 3B ends. On the other hand, a negative answer to (338) means that not all of the mandatory risk factors have been processed, and the method returns to step (332) for determining whether migration can proceed with respect to the next or non-assessed mandatory risk factor.

Referring now to FIG. 4, a flowchart (400) provides for the scoring of the non-mandatory risk factors and calculation of a composite risk score. The non-mandatory risk factor counting variable, Z, is initialized (402). An individual risk score F$_Z$ is assigned to the associated risk factor, RiskFactor$_Z$ (404), e.g. using a machine learning scoring model. Any suitable scale may be used for assigning the individual risk score F$_Z$. By way of example and without limitation, the scale may be 0 to 5, or 1 to 10, or another numerical range. The scale may be ascending or descending in value. According to an exemplary embodiment, the individual risk score F$_Z$ is representative of the risk involved with respect to migration based on the data for the risk factor. For example, in the case of F6 (Business Criticality), very high business criticality may be scored as an 8 to 10 on a 10-point scale, whereas a very low business criticality may be scored as a 1 to 3 on a 10-point scale.

After (404), an individual weight value W$_Z$ is assigned (406) to the RiskFactor$_Z$, e.g., risk factor F6. In an embodiment, the assignment at step (406) uses a machine learning score model. Similarly, in an exemplary embodiment, the cumulative weight value for the non-mandatory risk factors, e.g., Z$_1$ to Z$_{Total}$, equals 1.0. That is, each individual risk factor weight, W$_Z$, is between 0.0 and 1.0 for each non-mandatory risk factor, and the summation of the individual weight values for all the second risk factors is one.

$$\Sigma_Z W_Z = 1$$

Scoring of the individual risk scores F$_Z$ and/or assigning of weight values W$_Z$ may be performed manually, such as by a subject matter expert (SME). In an embodiment, W$_Z$ are weights applied by a user based on the user's perception of priority. In an exemplary embodiment, the ML scoring model may be trained and/or used for assigning individual weight values W$_Z$. Alternatively, scoring of the individual risk scores $F_Z$ and/or assigning of weight values $W_Z$ may be performed by having the score manager (152) leverage one or more ML models.

Following step (406), the non-mandatory risk factor counting variable Z is incremented (408). A decision (410) is then made as to whether each of the non-mandatory risk factors have been assigned an individual risk score and an individual weight value. In the above example, in which F6 to F14 are non-mandatory risk factors, $Z_{Total}$ equals nine. If the decision (410) is answered in the negative, additional non-mandatory risk factors remain for evaluation and the process returns to decision (404) for the next non-mandatory risk factor, e.g., F7. In the above example, F6 to F14 are all non-mandatory risk factors, and thus the process would repeat itself for each of F6 to F14, requiring that each non-mandatory risk factor be assigned an individual risk score and an individual weight value.

A composite risk score is calculated for the non-mandatory risk factors (412), whereby a summation of the product of the individual weight value $W_Z$ and the individual risk score $F_Z$ for each non-mandatory risk factor is calculated. That is, the composite risk score is calculated by:

$$\sum_{Z=1}^{Z_{Total}} W_Z \times F_Z$$

Referring now more particularly to flowchart (500) of FIG. 5, after the composite risk score has been calculated (412), a recommendation as to at least one remediation action may be made to reduce a risk associated with the migration operation (502), e.g., using a machine learning recommendation model. In an exemplary embodiment, the recommendation (502) is based on at least the composite risk score, and optionally is also based on one or more of the individual risk scores $F_Z$. In a further embodiment, the recommendation (502) is further based on one or more of the individual weight values $W_Z$. It is understood that in an embodiment there may not be a need or requirement for a remediation action.

In an exemplary embodiment, the recommendation (502) is a remediation action with respect to one or more of the non-mandatory risk factors. In another exemplary embodiment, the recommendation (502) comprises one or more remediation actions with respect to a plurality of the second risk factors. The recommendation (502) may be performed manually, such as by a subject matter expert (SME), or by having the recommendation manager (154) leverage a ML model, as discussed in greater detail below.

The at least one recommended action is implemented prior to execution of the migration operation (504). In the event multiple remediation actions are recommended, the remediation actions may be implemented consecutively, such as after each recommendation is made, or the remediation actions may be implemented simultaneously, such as after all of the recommendations are made.

A migration plan incorporating the at least one recommended remediation action is generated (506). At (508), the migration plan is executed to determine the outcome of the migration operation executed according to the migration plan. The outcome of the migration operation may be stored with a history of previous migration operations and used to train a ML prediction model, discussed in greater detail below. Alternatively, at (510), a prediction as to the outcome of the migration plan execution is conducted, e.g., before the migration plan is carried out. The prediction (510) may be performed manually, such as by an SME, or by having the prediction manager (156) leverage a corresponding prediction ML model.

Exemplary embodiments of the score manager (152), the recommendation manager (154), and the prediction manager (156) will be discussed in greater detail below. The computer system, the computer program product, and the method embodied herein may comprise use of one, two, or all of the managers (152), (154), and (156) and/or their associated ML models.

In an exemplary embodiment, the score manager (152) is configured to leverage data corresponding to past or historic migration operations to train a first ML model (also referred to herein as a ML scoring model) to assign a respective weight value to a corresponding and identified non-mandatory risk factor. For example, in the flowchart (400) of FIG. 4, the ML scoring model may be trained and/or used for assigning individual weight value $W_Z$ in step (406). In an exemplary embodiment, the first ML model is a regression model utilizing a regression algorithm for supervised machine learning. Examples of regression algorithms that may be practiced herein include linear regression, regression neural networks, and non-linear algorithms such as support vector regression (SVR). In an exemplary embodiment, the first ML model is a non-linear model such as a SVR model. Multiple second risk factors may be assigned weight values by using a multi-output SVR model using a cokriging (Gaussian progression for interpolation) method.

In addition or in the alternative to using the ML scoring model in connection with step (406), the score manager (152) may be configured to leverage the first ML model to assign respective risk score values to the identified non-mandatory risk factors. For example, in the flowchart (400) of FIG. 4 the ML scoring model may be used in step (404). Alternatively, the individual risk scores $F_Z$ can be entered manually, e.g., by an SME, including to train the first ML model (or ML scoring model). As part of calculating the composite risk score, and in an exemplary embodiment, the ML model can be trained to predict the scores based on information such as the client's industry, company size, etc.

In an exemplary embodiment, the recommendation manager (154) is configured to leverage the data with respect to past or historic migration operations to train a second ML model (also referred to herein as a ML recommendation model), with output from the second ML model to recommend at least one remediation action to reduce risk to the migration operation. For example, the second ML model can be used in connection with step (502) of FIG. 5. In an exemplary embodiment, reinforcement learning (RL) is used to train the second ML model. It is understood that the set of remediation actions to recommend is non-stationary and the action space is subject to growth. According to an embodiment, S is defined as state space and $s_t$ is defined as a current risk profile of a user at time t, and A is defined as action space and $a_t$ is defined as an action from a list of remediation actions for recommendation to a client based on the current risk profile $s_t$. After browsing the recommended list, the user can perform or skip the remediation action, and generate/execute a new migration plan accordingly. The client receives a reward $r_t(s_t, a_t)$ according to the migration outcome (success/failure). A transition probability is learned by training the second ML model. Every time there is a current state and a recommended action, there is a next state and a corresponding reward. In an embodiment, the goal is to find or identify an action to maximize the reward. The transition probability $P(s_{t+1}=s'|s_t=s, a_t=a)$ is the probability of the occurrence of transitioning between two states, from state $s_t$ to state $s_{t+1}$ and recommended action a.

In another exemplary embodiment, the prediction manager (156) is configured to leverage the data with respect to past or historic migration operations to train a third ML model (also referred to herein as a ML prediction model) to predict an outcome of a migration plan that incorporates the recommended remediation action(s). For example, in the flowchart (500) of FIG. 5, the ML prediction model may be trained and/or used for step (510). In an exemplary embodiment, the third ML model (or ML prediction model) is a random forest model.

The random forest model is used in an exemplary embodiment to predict a binary outcome, specifically, whether migration will be successful or unsuccessful (or "yes" or "no" as to the success of migration). Training a random forest typically involves a bagging or bootstrap aggregating step, which may involve, for example, selection of a random subset of training data and/or a random subset of the training instances. The random subsets of data are used to build multiple decision trees, collectively referred to as a forest or random forest. The output of a random forest prediction is the most voted prediction, which in a binary outcome scenario is a majority vote, e.g., a successful or unsuccessful outcome, of the individual trees in the forest, with each decision tree providing a single vote. The random forest model may be trained using training sets from a database of past or historical migration operations. The random forest model allows a large number of weakly correlated classifiers to form a strong classifier.

Figure 7:
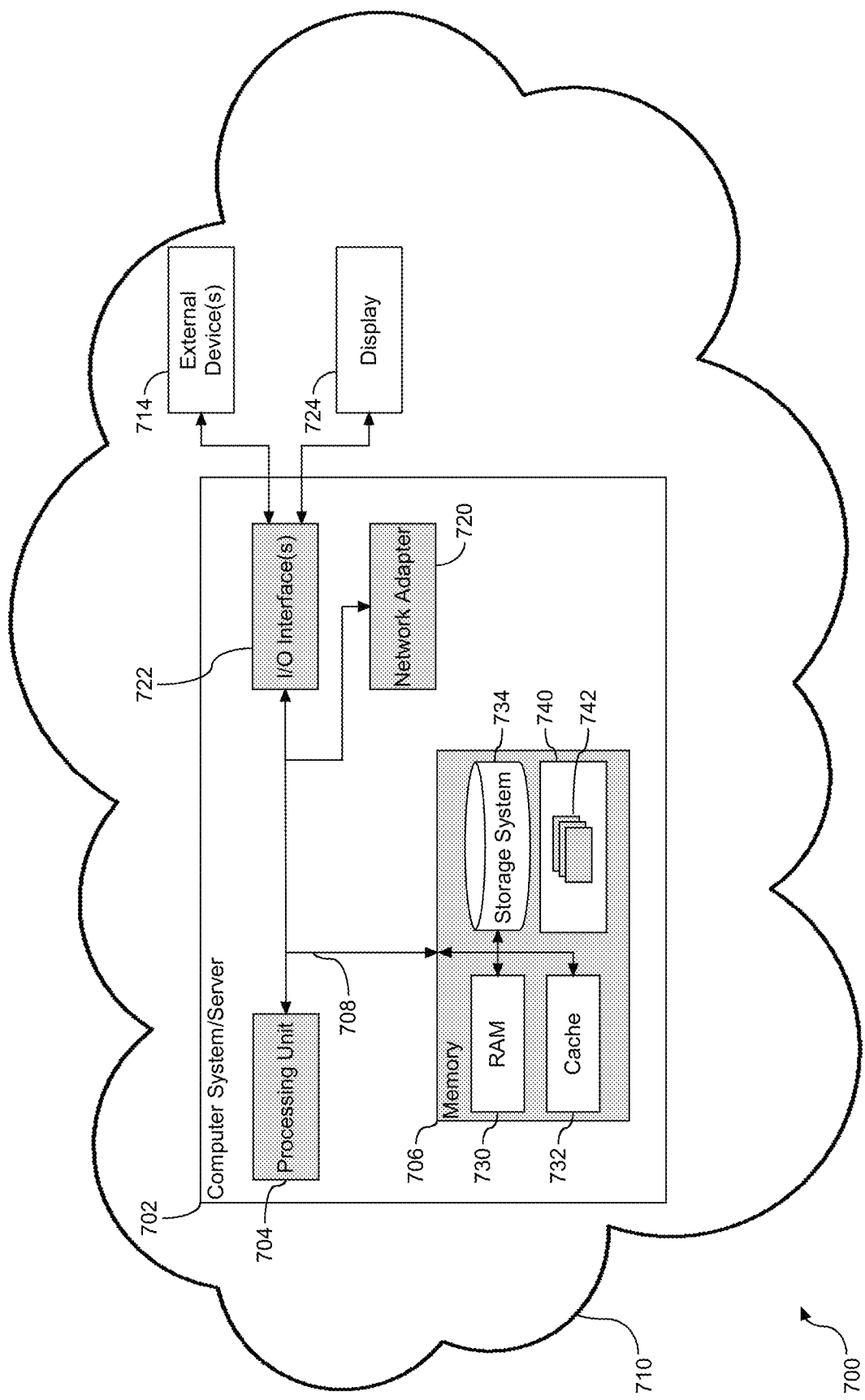
FIG. 7 depicts a block diagram illustrating an example of a computer system/server of a cloud based support system, to implement the system and processes described above with respect to FIGS. 1-6.

Embodiments shown and described herein may be in the form of a computer system for use with an intelligent computer platform for providing orchestration of activities across one or more domains to minimize risk. Aspects of the tools (152), (154), and (156)) and their associated functionality may be embodied in a computer system/server in a single location, or in an embodiment, may be configured in a cloud based system sharing computing resources. With reference to FIG. 7, a block diagram (700) is provided illustrating an example of a computer system/server (702), hereinafter referred to as a host (702) in communication with a cloud based support system (710), to implement the system, tools, and processes described above in FIGS. 1-6. In an embodiment, host (702) is a node of a cloud computing environment. The host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (702) may be described in the general context of computer system-executable instructions, such as program modules, being executed by a computer system. Generally, program modules may include routines, programs, objects, components, logic, data structures, and so on that perform particular tasks or implement particular abstract data types. The host (702) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). The bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (702) typically includes a variety of computer system readable media. Such media may be any available media that is accessible by the host (702) and it includes both volatile and non-volatile media, removable and non-removable media.

The system memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (708) by one or more data media interfaces.

Program/utility (740), having a set (at least one) of program modules (742), may be stored in the system memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to dynamically assess risk factors, make recommendations as to remediation actions, and/or predict an outcome of a migration plan. For example, the set of program modules (742) may include the tools (152), (154), and (156) as shown in FIG. 1.

The host (702) may also communicate with one or more external devices (714), such as a keyboard, a pointing device, etc.; a display (724); one or more devices that enable a user to interact with the host (702); and/or any devices (e.g., network card, modem, etc.) that enable the host (702) to communicate with one or more other computing devices. Such communication can occur via Input/Output (I/O) interface(s) (722). Still yet, the host (702) can communicate with one or more networks such as a local area network (LAN), a general wide area network (WAN), and/or a public network (e.g., the Internet) via network adapter (720). As depicted, the network adapter (720) communicates with the other components of the host (702) via the bus (708). In an embodiment, a plurality of nodes of a distributed file system (not shown) is in communication with the host (702) via the I/O interface (722) or via the network adapter (720). It should be understood that although not shown, other hardware and/or software components could be used in conjunction with the host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional tools described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 8:
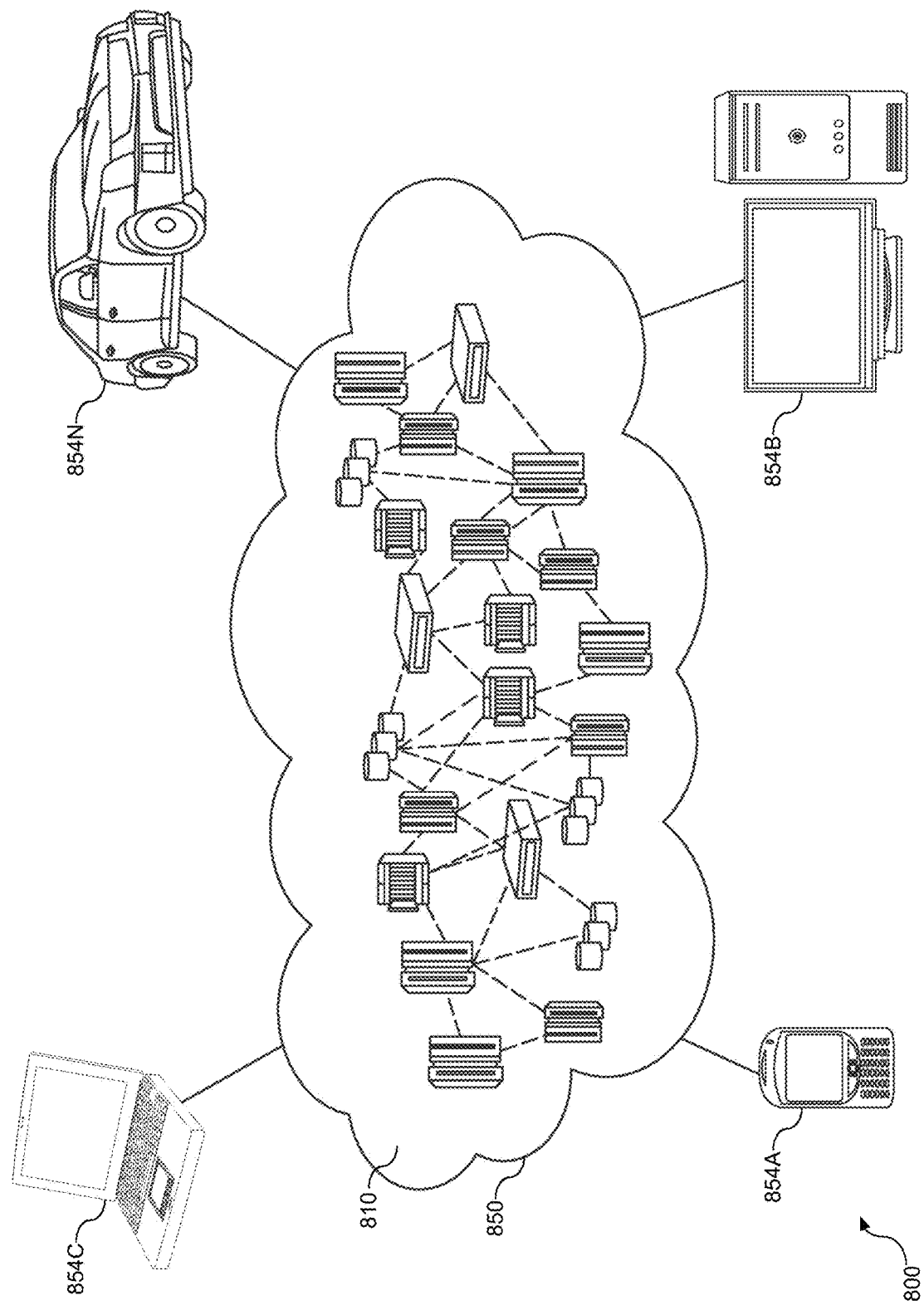
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
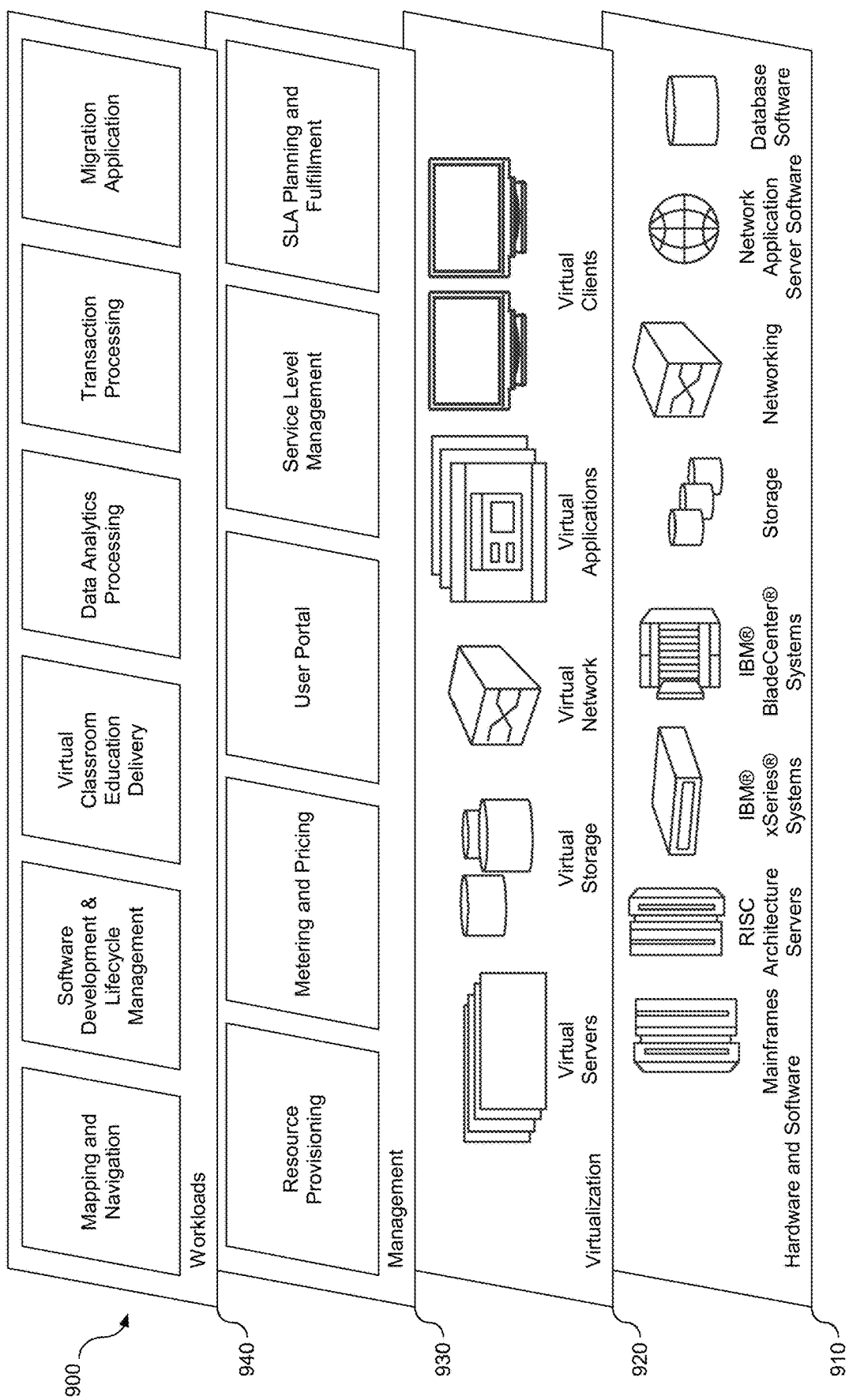
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In an example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and application migration.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to support migration while reducing risk.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A method comprising:
   identifying a plurality of risk factors associated with a migration operation;
   selectively categorizing the risk factors as either one or more first risk factors representing at least one mandatory specification or as one or more second risk factors representing at least one non-mandatory specification;
   leveraging at least one machine learning (ML) model to apply artificial intelligence to assess the one or more second risk factors independently of the one or more first risk factors;
   responsive to the leveraging of the at least one ML model, recommending at least one remediation action to reduce risk to the migration operation;
   implementing the at least one recommended remediation action prior to execution of the migration operation; and
   generating a migration plan incorporating the at least one recommended remediation action for the migration operation, wherein the migration plan is configured to be subject to execution and wherein when subject to execution at least one of one or more computing resources is configured to migrate to a target environment.

2. The method of claim 1, wherein the leveraging the at least one ML model comprises training and/or using the ML model to assign respective weight values to the one or more second risk factors.

3. The method of claim 1, wherein the leveraging the at least one ML model comprises training and/or using the ML model to recommend the at least one remediation action to reduce risk to the migration operation.

4. The method of claim 1, further comprising predicting an outcome of the migration plan.

5. The method of claim 1, wherein the leveraging the at least one ML model comprises:
   training and/or using a ML scoring model to apply artificial intelligence to assign respective weight values to the one or more second risk factors; and
   training and/or using a ML recommendation model to apply artificial intelligence to recommend the at least one remediation action that reduces risk to the migration operation.

6. The method of claim 5, wherein:
   the ML scoring model is a support vector regression (SVR) model; and
   the ML recommendation model is trained by leveraging reinforcement learning.

7. The method of claim 5, further comprising:
   predicting an outcome of the migration plan, including training and/or using a ML prediction model to apply artificial intelligence to predict the outcome of the migration plan.

8. The method of claim 7, wherein:
   the ML scoring model is a support vector regression (SVR) model;
   the ML recommendation model is trained by leveraging reinforcement learning; and
   the ML prediction model is a random forest model.

9. The method of claim 1, wherein the leveraging the at least one ML model further comprises:
   assigning respective risk score values to the one or more second risk factors;
   assigning respective weight values to the one or more second risk factors; and
   calculating a composite risk score based on the assigned risk score values and the assigned weight values.

10. The method of claim 9, the recommending the at least one remediation action to reduce risk to the migration operation is based on at least the composite risk score and one or more of the risk score values.

11. A computer system comprising:
    a processing unit operatively coupled to memory; and
    an artificial intelligence (AI) platform operatively coupled to the processing unit, the AI platform configured with one or more tools to support a migration operation that comprises identifying a plurality of risk factors associated with the migration operation, the one or more tools comprising:
    a score manager configured to:
        selectively categorize the identified risk factors as either one or more first risk factors representing at least one mandatory specification or as one or more second risk factors representing at least one non-mandatory specification; and
        leverage a first machine learning (ML) model to apply artificial intelligence to assess the one or more second risk factors representing the at least one non-mandatory specification independently of the one or more first risk factors representing the at least one mandatory specification;
    a recommendation manager configured to, responsive to the assessment by the first ML model, leverage a second ML model to apply artificial intelligence to recommend at least one remediation action that reduces risk to the migration operation; and
    a prediction manager configured to leverage a third ML model to apply artificial intelligence to predict an outcome of a migration plan incorporating the at least one recommended remediation action, wherein the migration plan is configured to be executed by the processor and wherein when subject to execution at least one of one or more computing resources is configured to migrate to a target environment.

12. Computer system of claim 11, wherein the score manager is further configured leverage the first ML model to:
    assign respective risk score values to the one or more second risk factors;
    assign respective weight values to the one or more second risk factors; and
    calculate a composite risk score based on the assigned risk score values and the assigned weight values.

13. The computer system of claim 12, wherein the recommended remediation action is based on at least the composite risk score and one or more of the risk score values.

14. The computer system of claim 11, wherein:
    the first ML model is a support vector regression (SVR) model;
    the second ML model is trained by leveraging reinforcement learning; and
    the third ML model is a random forest model.

15. A computer program product comprising:
    a computer readable storage medium having a program code embodied therewith to support a migration operation that comprises identifying a plurality of risk factors associated with the migration operation, the program code executable by a processor to:
        selectively categorize the identified risk factors as either one or more first risk factors representing at least one mandatory specification or as one or more second risk factors representing at least one non-mandatory specification;
        leverage a first machine learning (ML) model to apply artificial intelligence to assess the one or more second risk factors representing the at least one non-mandatory specification independently of the one or more first risk factors representing the at least one mandatory specification;
        leverage a second ML model, responsive to the assessment by the first ML model, to apply artificial intelligence to recommend at least one remediation action that reduces risk to the migration operation; and
        leverage a third ML model to apply artificial intelligence to predict an outcome of a migration plan incorporating the at least one recommended remediation action, wherein the migration plan is configured to be executed by the processor, and wherein when subject to execution at least one of one or more computing resources is configured to migrate to a target environment.

16. The computer program product of claim 15, further comprising program code executable by the processor to leverage the first ML model to:
    assign respective risk score values to the one or more second risk factors;
    assign respective weight values to the one or more second risk factors; and/or
    calculate a composite risk score based on the assigned risk score values and the assigned weight values.

17. The computer program product of claim 16, wherein:
    the recommended remediation action is based on at least the composite risk score and one or more of the risk score values.

18. The method of claim 1, wherein satisfaction of the at least one mandatory specification is necessary to the migration operation, and wherein satisfaction of the at least one non-mandatory specification is optional to the migration operation.

19. The method of claim 1, wherein the target environment associated with the migration of the one or more computing resources is a remote service provider location.

20. The method of claim 19, wherein the one or more computing resources comprises data, applications, services, or a combination thereof.

* * * * *